United States Patent
Wang et al.

(10) Patent No.: US 10,110,284 B2
(45) Date of Patent: Oct. 23, 2018

(54) PROVIDING A FORMAT INDICATOR COMPRISING RANK INDICATION AND CHANNEL STATE INFORMATION SPATIAL DOMAIN RESOLUTION TYPE

(71) Applicant: AT&T Intellectual Property I, L.P., Atlanta, GA (US)

(72) Inventors: Xiaoyi Wang, Austin, TX (US); Salam Akoum, Austin, TX (US); Arunabha Ghosh, Austin, TX (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 14 days.

(21) Appl. No.: 15/343,152

(22) Filed: Nov. 3, 2016

(65) Prior Publication Data

US 2018/0123653 A1 May 3, 2018

(51) Int. Cl.
| | |
|---|---|
| *H04B 7/0417* | (2017.01) |
| *H04B 7/08* | (2006.01) |
| *H04L 29/08* | (2006.01) |
| *H04W 72/12* | (2009.01) |
| *H04B 7/06* | (2006.01) |

(52) U.S. Cl.
CPC ......... *H04B 7/0417* (2013.01); *H04B 7/0626* (2013.01); *H04L 67/12* (2013.01); *H04W 72/1273* (2013.01)

(58) Field of Classification Search
CPC .. H04B 7/0639; H04B 7/0636; H04B 7/0632; H04B 7/0626; H04B 7/0478
See application file for complete search history.

(56) References Cited

U.S. PATENT DOCUMENTS

| | | | |
|---|---|---|---|
| 7,885,211 B2 | 2/2011 | Shen et al. | |
| 8,705,482 B2 | 4/2014 | Sun et al. | |
| 8,750,205 B2 | 6/2014 | Chen et al. | |
| 9,247,557 B2 | 1/2016 | Liao et al. | |
| 9,356,724 B2 | 5/2016 | Etemad et al. | |
| 2008/0219370 A1* | 9/2008 | Onggosanusi ....... | H04B 7/0417 375/260 |
| 2013/0182789 A1 | 7/2013 | Ko et al. | |
| 2013/0301560 A1 | 11/2013 | Geirhofer et al. | |
| 2014/0269596 A1 | 9/2014 | Kim et al. | |

(Continued)

FOREIGN PATENT DOCUMENTS

| | | |
|---|---|---|
| CN | 102387006 A | 3/2012 |
| CN | 104009828 A | 8/2014 |

OTHER PUBLICATIONS

R1-091835, Consideration on UE Feedback in Support of CoMP, 3GPP TSG RAN WG1 57, Texas Instruments, San Francisco, May 4-8, 2009.*

(Continued)

*Primary Examiner* — Aristocratis Fotakis
(74) *Attorney, Agent, or Firm* — Amin, Turocy & Watson, LLP

(57) ABSTRACT

A user equipment can be configured to evaluate a reference signal from a network node and determine channel state information comprising a format indicator, wherein the format indicator comprises a rank indicator and the channel state information spatial resolution type. The user equipment can transmit to the network node the channel state information, which can be decoded by a network node to determine transmission scheduling parameters to be transmitted to the user equipment.

20 Claims, 6 Drawing Sheets

(56) References Cited

U.S. PATENT DOCUMENTS

| | | | |
|---|---|---|---|
| 2015/0215015 A1 | 7/2015 | Chen et al. | |
| 2016/0156401 A1* | 6/2016 | Onggosanusi | H04B 7/0478 |
| | | | 370/329 |
| 2016/0197657 A1 | 7/2016 | Ko et al. | |
| 2016/0233938 A1 | 8/2016 | Mondal et al. | |
| 2016/0261387 A1 | 9/2016 | Etemad et al. | |
| 2016/0262118 A1* | 9/2016 | Kim | H04W 52/365 |
| 2016/0353424 A1* | 12/2016 | Stirling-Gallacher | |
| | | | H04B 7/0626 |
| 2016/0359538 A1* | 12/2016 | Onggosanusi | H04B 7/0469 |
| 2017/0302353 A1* | 10/2017 | Rahman | H04B 7/0639 |
| 2018/0091992 A1* | 3/2018 | Frenne | H04W 24/10 |

OTHER PUBLICATIONS

R1-166783, Advanced CSI feedback for NR, 3GPP TSG RAN WG1 #86, Samsung, Gothenburg, Sweden, Aug. 22-26, 2016.*

Frank, Philipp, Andreas Müller, and Joachim Speidel. "Fair Performance Comparison between CQI-and CSI-based MU-MIMO for the LTE Downlink." Wireless Conference (EW), 2010 European. IEEE, 2010. 6 pages.

International Search Report and Written Opinion for Application No. PCT/US20171052575 dated Dec. 15, 2017, 19 pages.

AT&T, "Generic CSI feedback framework for NR MIMO" 3GPP TSG RAN WG1 Meeting #86b Lisbon, Portugal Oct. 10-14, 2016, R1-1609388, URL: http://www.3gpp.org/ftp/Meetings_3GPP_SYNC/RAN1/Docs/ 7 pages.

Samsung, "Discussions on CSI-RS design for NR MIMO" 3GPP TSG RAN WG1 #86-bis Lisbon, Portugal, Oct. 10-14, 2016, R1-1609098, URL: http://www.3gpp.org/ftp/Meetings 3GPPSYNC/RAN1/Docs/ 4 pages.

Samsung, "Outcome of Thursday Offline Session on NR MIMO" 3GPP TSG RAN WG1 Meeting #86bis Lisbon, Portugal Oct. 10-14, 2016, R1-1610974, URL:http://www.3gpp.org/ftp/tsg ran/WGI RL1/TSGRI 86b/Docs/, 1 page.

Massimo et al., "Enabling the IoT Machine Age With 5G: Machine-Type Multicast Services for Innovative Real-Time Applications", IEEE Access, vol. 4, May 26, 2016, pp. 5555-5569.

* cited by examiner

PROVIDING A FORMAT INDICATOR COMPRISING RANK INDICATION AND CHANNEL STATE INFORMATION SPATIAL DOMAIN RESOLUTION TYPE

TECHNICAL FIELD

The present application relates generally to the field of mobile communication and more specifically to a Channel State Information (CSI) feedback framework for multiple input multiple output (MIMO) techniques.

BACKGROUND

Radio technologies in cellular communications have grown rapidly and evolved since the launch of analog cellular systems in the 1980s, starting from the First Generation (1G) in 1980s, Second Generation (2G) in 1990s, Third Generation (3G) in 2000s, and Fourth Generation (4G) in 2010s (including variants of LTE such as TD-LTE, AXGP, LTE-A and TD-LTE-A and other releases). The amount of traffic in cellular networks has experienced a tremendous amount of growth and expansion, and there are no indications that such growth will decelerate. It is expected that this growth will include use of the network not only by humans, but also by an increasing number of machines that communicate with each other, for example, surveillance cameras, smart electrical grids, sensors, home appliances and other technologies in connected homes, and intelligent transportation systems (e.g., the Internet of Things (IOT)). Additional technological growth includes 4K video, augmented reality, cloud computing, industrial automation, and V2V.

Consequently, advancement in future networks are driven by the need to provide and account for massive connectivity and volume, expanded throughput and capacity, and ultra-low latency. Fifth generation (5G) access networks, which can also be referred to as New Radio (NR) access networks, are currently being developed and expected to handle a very wide range of use cases and requirements, including among others mobile broadband (MBB) and machine type communications (e.g., involving IOT devices). For mobile broadband, 5G wireless communication networks are expected to fulfill the demand of exponentially increasing data traffic and to allow people and machines to enjoy gigabit data rates with virtually zero latency. Compared to existing fourth generation (4G) technologies, such as long-term evolution (LTE) networks and advanced LTE networks, 5G provides better speeds and coverage than the existing 4G network, targeting much higher throughput with low latency and utilizing higher carrier frequencies (e.g., higher than 6 Ghz) and wider bandwidths. A 5G network also increases network expandability up to hundreds of thousands of connections.

The above-described background relating to wireless networks is merely intended to provide a contextual overview of some current issues, and is not intended to be exhaustive. Other contextual information may become further apparent upon review of the following detailed description.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

Figure 1:
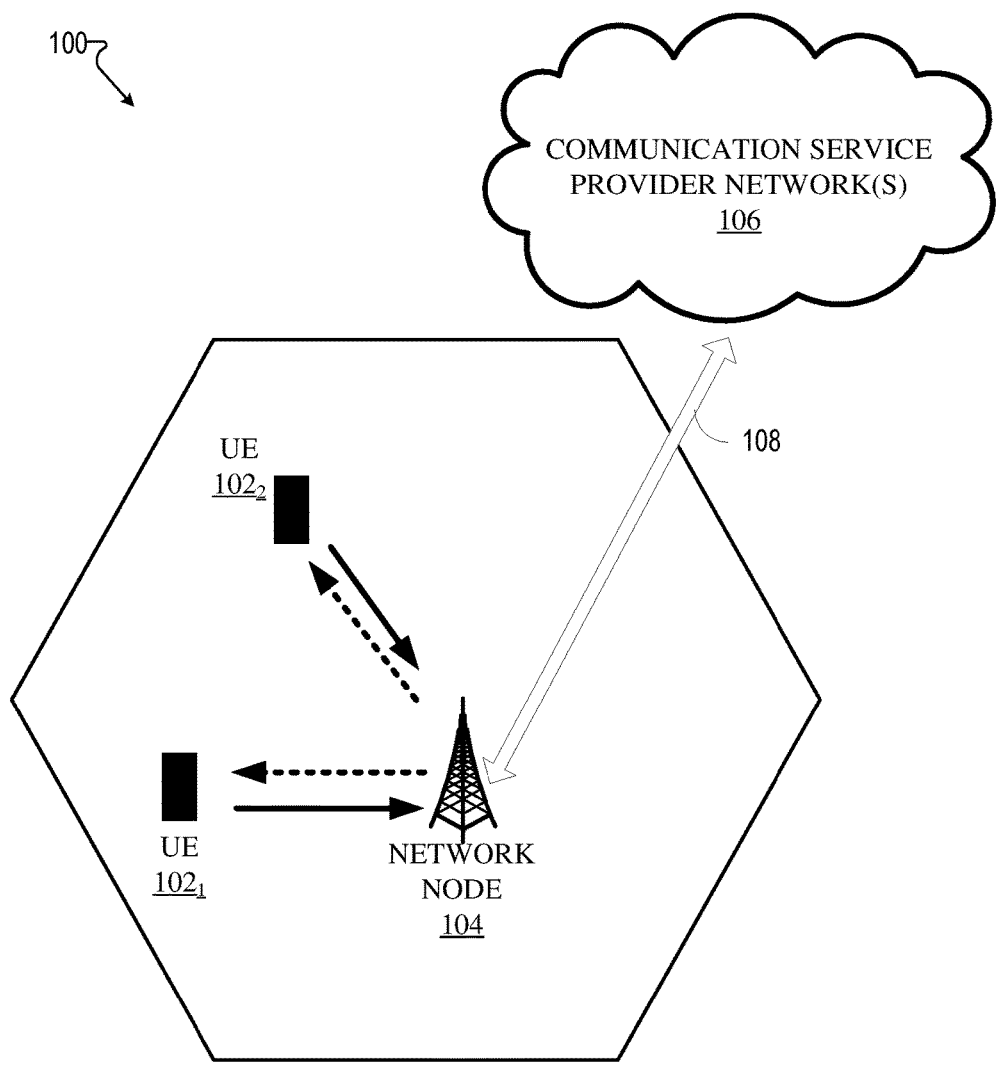
FIG. 1 illustrates an example wireless communication system that in which network nodes and user equipment can implement the use of a format indicator in accordance with various aspects and embodiments of the subject disclosure.

The subject disclosure is now described with reference to the drawings, wherein like reference numerals are used to refer to like elements throughout. The following description and the annexed drawings set forth in detail certain illustrative aspects of the subject matter. However, these aspects are indicative of but a few of the various ways in which the principles of the subject matter can be employed. Other aspects, advantages, and novel features of the disclosed subject matter will become apparent from the following detailed description when considered in conjunction with the provided drawings. In the following description, for purposes of explanation, numerous specific details are set forth in order to provide a thorough understanding of the subject disclosure. It may be evident, however, that the subject disclosure may be practiced without these specific details. In other instances, well-known structures and devices are shown in block diagram form in order to facilitate describing the subject disclosure.

To meet the demand for data centric applications, features of proposed 5G networks may comprise: increased peak bit rate (e.g., 20 Gbps), larger data volume per unit area (e.g., high system spectral efficiency—for example about 3.5 times that of spectral efficiency of long term evolution (LTE) systems), high capacity that allows more device connectivity both concurrently and instantaneously, lower battery/power consumption (which reduces energy and consumption costs), better connectivity regardless of the geographic region in which a user is located, a larger numbers of devices, lower infrastructural development costs, and higher reliability of the communications. Thus, 5G networks may allow for: data rates of several tens of megabits per second should be supported for tens of thousands of users, 1 gigabit per second to be offered simultaneously to tens of workers on the same office floor, for example; several hundreds of thousands of simultaneous connections to be supported for massive sensor deployments; improved coverage, enhanced signaling efficiency; reduced latency compared to LTE.

The upcoming 5G access network may utilize higher frequencies (e.g., >6 GHz) to aid in increasing capacity. Currently, much of the millimeter wave (mmWave) spectrum, the band of spectrum between 30 gigahertz (Ghz) and 300 Ghz is underutilized. The millimeter waves have shorter wavelengths that range from 10 millimeters to 1 millimeter, and these mmWave signals experience severe path loss, penetration loss, and fading. However, the shorter wavelength at mmWave frequencies also allows more antennas to be packed in the same physical dimension, which allows for large-scale spatial multiplexing and highly directional beamforming.

Performance can be improved if both the transmitter and the receiver are equipped with multiple antennas. Multi-antenna techniques can significantly increase the data rates and reliability of a wireless communication system. The use of multiple-input multiple-output (MIMO) techniques can improve mmWave communications. MIMO, which was introduced in the third generation partnership project (3GPP) and has been in use (including with LTE), involves the use of multi-antenna techniques comprising multiple transmit and multiple receive antennas in both transmission and receiver equipment for wireless radio communications. It has been widely recognized as one important component for access networks operating in higher frequencies. In addition to transmit diversity (or spatial diversity), other techniques such as spatial multiplexing (comprising both open-loop and closed-loop), beamforming, and codebook-based precoding also address communication issues such as efficiency, interference, and range.

In typical cellular radio access networks (e.g., universal mobile telecommunications system (UMTS) networks), base stations, which are referred to by some as network nodes (e.g., NodeB, eNodeB (e.g., evolved NodeB), etc.), can communicate with user equipment (UE), which can be any device (e.g., hand-held mobile phone, a computer, a tablet having a mobile broadband adapter, IOT device). It roughly corresponds to the mobile station (MS) in GSM systems. Thus, the network node (e.g., network node device) provides connectivity between the UE and the wider cellular network.

In a case of beamforming, the UE estimates the channel characteristics and sends information (e.g., channel quality information (CQI)) back to the base station (node). The node then adjusts the rates and phase shifts for each of its antenna elements and sends an array of signals that focuses the wavefront in the direction of the UE, thereby allowing a higher data rate to the UE. In another technique, the UE can send a reference signal back to the node. The node takes the received reference signal from the UE, estimates the condition of the channel, and after correcting for more issues (e.g., interference), adjusts the beamforming rates for each antenna, and the node again changes parameters to transmit a better beam toward the UE.

In another case that uses codebook-based precoding, the node uses different codebooks, which can be found in standards specifications, each of which can relate to different types of MIMO matrices (for example, a codebook of precoding matrices for 2×2 MIMO). The codebooks can contain entries of precoding vectors and matrices, which are multiplied with the signal in the pre-coding stage of the node. The decision of which of these codebook entries to select is made at the node based on channel state information (CSI) feedback provided by the UE.

Based on the evaluation of a reference signal from the node to the UE, the UE provides CSI feedback to the node. The CSI feedback comprises a indicator of channel state information (e.g., known in LTE as a precoding matrix indicator (PMI)), indicator of channel quality (e.g., known in LTE as a channel quality indicator (CQI)), and an indication of rank (e.g., known in LTE as rank indicator (RI)), each of which is discussed further below.

With respect to the indicator of channel state information, after evaluating the reference signal, the UE recommends a suitable precoding matrix out of the appropriate codebook. The codebook is known (contained) at UE site and the node. For example, in LTE, this UE feedback identifying the precoding matrix is called the precoding matrix indicator (PMI, or advanced PMI in the case of advanced CSI) indicating a precoder in a codebook entry used for selecting transmission parameters between the network node and user equipment, wherein the UE points to the index of the precoder in one of the codebook entries. The UE is thus evaluating which pre-coding matrix would be better for the reception quality.

Additionally, the CSI feedback also can comprise an indicator of channel quality (e.g., in LTE the channel quality indicator (CQI)), which indicates the channel quality of the channel between the network node and the user equipment for link adaptation on the network side.

Another CSI feedback report type is the rank indicator (RI) which provides an indication of the rank of the channel matrix, wherein the rank is the number of different transmission data streams (layers) transmitted in parallel (in other words, the number of spatial layers) between the network node and the user equipment. The RI determines the format of the rest of the CSI reporting messages. As an example, in the case of LTE, when RI is reported to be 1, the rank 1 codebook PMI will be transmitted with one CQI, and when RI is 2, a rank 2 codebook PMI and two CQIs will be transmitted. Since the RI determines the size of the PMI and CQI, it is separately encoded so the receiver can firstly decode the RI, and then use it to decode the rest of the CSI (PMI and CQI).

The UE's CSI feedback report typically containing (in the example of LTE), PMI, CQI, and RI information (among other information) is sent to the node via a feedback channel. The node scheduler uses the CSI feedback in choosing the parameters for downlink transmission. Thus, this feedback information provides the node with information regarding which MIMO technique to use, beamforming weights, etc.

As an enhancement on top of LTE MIMO, 5G NR has adopted two types of CSI feedback: Type I feedback is codebook-based PMI feedback with normal spatial resolution while type II is enhanced "explicit" feedback and/or codebook-based feedback with higher spatial resolution. In the traditional LTE CSI feedback framework, the CSI feedback type should be configurable on the network side, but network side configuration is not as efficient.

The subject disclosure of the present application describes enhancements to the format and processing of channel state information (CSI) feedback provided by a user equipment (UE) to a network node. Described herein are example computer processing systems, computer-implemented methods, apparatus, and computer program products for providing a format indicator (FI) comprising both the rank indicator (RI) as well an indicator as to the type of spatial domain resolution. In example embodiments, a user equipment determines the spatial domain resolution and transmits to a network node this information as a format indicator that can comprise a field indicating whether the CSI spatial resolution is Type 1 or Type 2), along with the rank indicator. The methods (e.g., processes and logic flows) described in this specification may be performed by devices (e.g., a UE, a network node, etc.) having programmable processors that execute machine executable instructions to facilitate performance of the operations described herein. Examples of such devices can be devices having circuitry and components as described in FIG. 5 and FIG. 6.

FIG. 1 illustrates of an example wireless communication system 100 that facilitates the provision of a format indicator (FI) in accordance with various aspects and embodiments of the subject disclosure. In one or more embodiments, system 100 can comprise one or more user equipment UEs 102, which can have one or more antenna panels having vertical and horizontal elements. A UE 102 can be a mobile device such as a cellular phone, a smartphone, a tablet computer, a wearable device, a virtual reality (VR) device, a heads-up display (HUD) device, a smart car, a machine-type communication (MTC) device, and the like. User equipment UE 102 can also comprise IOT devices that communicate wirelessly. In various embodiments, system 100 is or comprises a wireless communication network serviced by one or more wireless communication network providers. In example embodiments, a UE 102 can be communicatively coupled to the wireless communication network via a network node 104.

The non-limiting term network node (or radio network node) is used herein to refer to any type of network node serving a UE 102 and/or connected to other network node, network element, or another network node from which the UE 102 can receive a radio signal. Network nodes can also have multiple antennas for performing various transmission operations (e.g., MIMO operations). A network node can have a cabinet and other protected enclosures, an antenna mast, and actual antennas. Network nodes can serve several cells, also called sectors, depending on the configuration and type of antenna. Examples of network nodes (e.g., network node 104) can include but are not limited to: NodeB devices, base station (BS) devices, access point (AP) devices, and radio access network (RAN) devices. The network node 104 can also include multi-standard radio (MSR) radio node devices, including but not limited to: an MSR BS, an eNode B, a network controller, a radio network controller (RNC), a base station controller (BSC), a relay, a donor node controlling relay, a base transceiver station (BTS), a transmission point, a transmission node, an RRU, an RRH, nodes in distributed antenna system (DAS), and the like. In 5G terminology, the node can be referred to as a gNodeB device.

In example embodiments, the UE 102 can send and/or receive communication data via a wireless link to the network node 104. The dashed arrow lines from the network node 104 to the UE 102 represent downlink (DL) communications and the solid arrow lines from the UE 102 to the network nodes 104 represents an uplink (UL) communication.

System 100 can further include one or more communication service provider networks 106 that facilitate providing wireless communication services to various UEs, including UE 102, via the network node 104 and/or various additional network devices (not shown) included in the one or more communication service provider networks 106. The one or more communication service provider networks 106 can include various types of disparate networks, including but not limited to: cellular networks, femto networks, picocell networks, microcell networks, internet protocol (IP) networks Wi-Fi service networks, broadband service network, enterprise networks, cloud based networks, and the like. For example, in at least one implementation, system 100 can be or include a large scale wireless communication network that spans various geographic areas. According to this implementation, the one or more communication service provider networks 106 can be or include the wireless communication network and/or various additional devices and components of the wireless communication network (e.g., additional network devices and cell, additional UEs, network server devices, etc.). The network node 104 can be connected to the one or more communication service provider networks 106 via one or more backhaul links 108. For example, the one or more backhaul links 108 can comprise wired link components, such as a T1/E1 phone line, a digital subscriber line (DSL) (e.g., either synchronous or asynchronous), an asymmetric DSL (ADSL), an optical fiber backbone, a coaxial cable, and the like. The one or more backhaul links 108 can also include wireless link components, such as but not limited to, line-of-sight (LOS) or non-LOS links which can include terrestrial air-interfaces or deep space links (e.g., satellite communication links for navigation).

Wireless communication system 100 can employ various cellular technologies and modulation schemes to facilitate wireless radio communications between devices (e.g., the UE 102 and the network node 104). For example, system 100 can operate in accordance with a UMTS, long term evolution (LTE), high speed packet access (HSPA), code division multiple access (CDMA), time division multiple access (TDMA), frequency division multiple access (FDMA), multi-carrier code division multiple access (MC-CDMA), single-carrier code division multiple access (SC-CDMA), single-carrier FDMA (SC-FDMA), OFDM, (DFT)-spread OFDM or SC-FDMA)), FBMC, ZT DFT-s-OFDM, GFDM, UFMC, UW DFT-Spread-OFDM, UW-OFDM, CP-OFDM, resource-block-filtered OFDM, and UFMC. However, various features and functionalities of system 100 are particularly described wherein the devices (e.g., the UEs 102 and the network device 104) of system 100 are configured to communicate wireless signals using one or more multi carrier modulation schemes, wherein data symbols can be transmitted simultaneously over multiple frequency subcarriers (e.g., OFDM, CP-OFDM, DFT-spread OFMD, UFMC, FMBC, etc.).

In various embodiments, system 100 can be configured to provide and employ 5G wireless networking features and functionalities. 5G wireless communication networks are expected to fulfill the demand of exponentially increasing data traffic and to allow people and machines to enjoy gigabit data rates with virtually zero latency. Compared to 4G, 5G supports more diverse traffic scenarios. For example, in addition to the various types of data communication between conventional UEs (e.g., phones, smartphones, tablets, PCs, televisions, Internet enabled televisions, etc.) supported by 4G networks, 5G networks can be employed to support data communication between smart cars in association with driverless car environments, as well as machine type communications (MTCs). Considering the drastic different communication needs of these different traffic scenarios, the ability to dynamically configure waveform parameters based on traffic scenarios while retaining the benefits of multi carrier modulation schemes (e.g., OFDM and related schemes) can provide a significant contribution to the high speed/capacity and low latency demands of 5G networks. With waveforms that split the bandwidth into several sub-bands, different types of services can be accommodated in different sub-bands with the most suitable waveform and numerology, leading to an improved spectrum utilization for 5G networks.

In various embodiments, a network node and a UE can interact. In example embodiments, a user equipment (e.g., UE 102) can determine the spatial domain resolution from evaluating a reference signal from a network node (e.g., network node 104), and transmit this information as part of channel state information (CSI) feedback. The CSI feedback can include as a parameter a format indicator (FI), which comprises the rank indicator (RI) and also information indicating whether the CSI spatial domain resolution is Type 1 or Type II).

Figure 2:
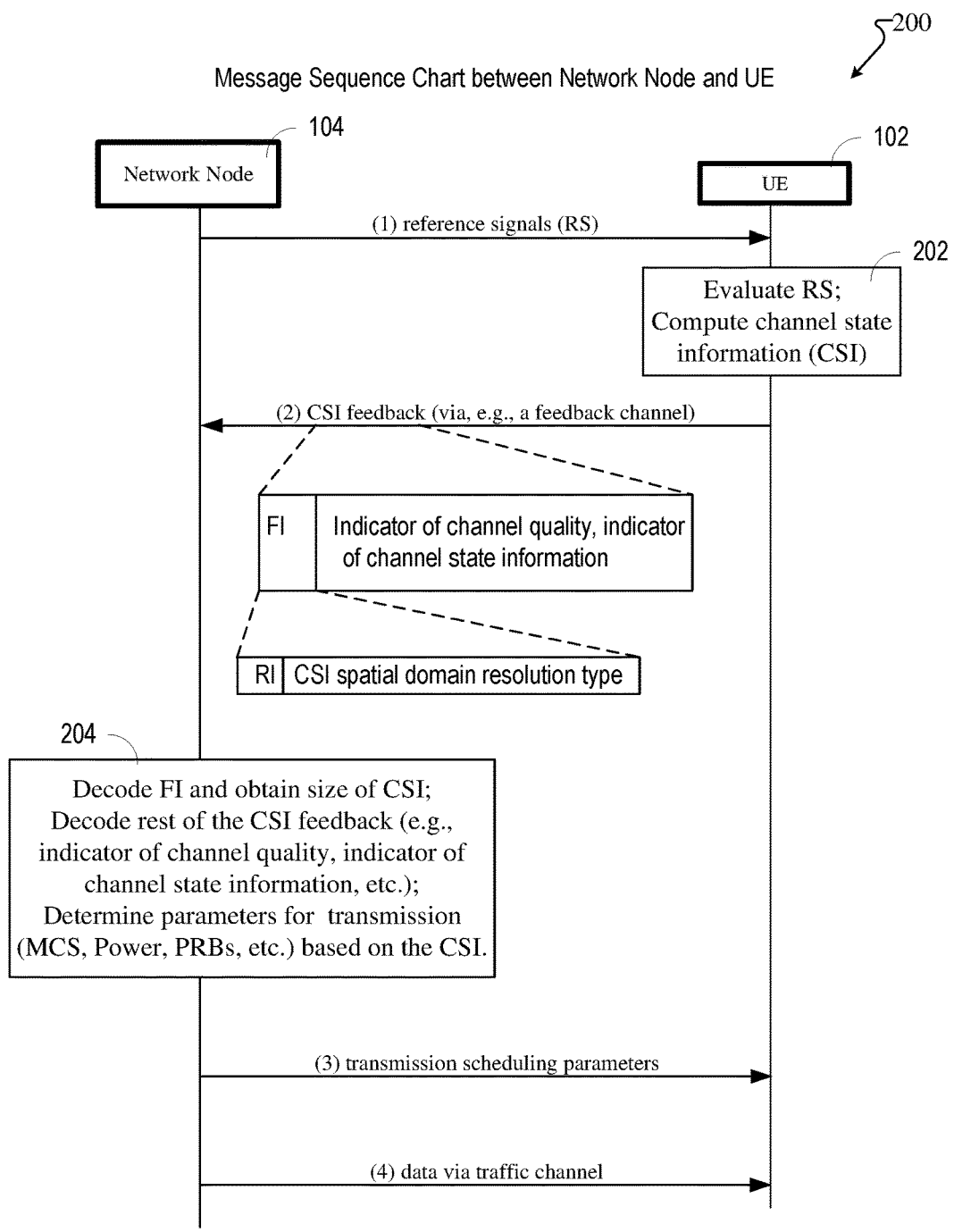
FIG. 2 illustrates an example schematic system block diagram of a message sequence chart between a network node and user equipment in accordance with various aspects and embodiments of the subject disclosure.

Referring to FIG. 2, illustrated as a sequence chart 200 between a network node and user equipment according to example embodiments, a network node (e.g., network node 104), can transmit a reference signal (RS), which can be beam formed or non beam formed, to a user equipment (e.g., UE 102). The reference signal can be cell specific or user equipment specific in relation to a profile of the user equipment 102 or some type of mobile identifier. From the reference signal, the user equipment 102 can at block 202 evaluate the reference signal and compute channel state information (CSI), which can be transmitted to the network node as CSI feedback (e.g., a CSI report). The CSI feedback can comprise: an indicator of channel quality, an indicator of channel state information, the best sub-band indices, best beam indices etc. The indicator of channel quality can applicable to the quality of the channel between the network node device and the user equipment (e.g., the indicator of channel quality can be similar to what is referred to in LTE terminology as the channel quality indicator (CQI) and can be used in a similar manner). The indicator of channel state information can be used for selection of transmission parameters for the different data streams transmitted between the network node device and the user equipment (e.g., the indicator of channel state information can be similar to what is referred to in LTE as the precoding matrix indicator PMI and can be used in a similar manner).

In example embodiments, the CSI feedback also comprises a format indicator (FI), wherein the format indicator comprises not only the rank information (RI), but also the CSI spatial domain resolution type. As mentioned above, 5G NR has adopted two types of CSI feedback. Type I feedback is codebook-based PMI feedback with normal spatial resolution while type II is enhanced "explicit" feedback and/or codebook-based feedback with higher spatial resolution. The type I normal spatial resolution can be, for example, a default spatial domain resolution type applicable by default to the different data streams. Depending on the location of a UE, the link conditions may warrant higher spatial resolution in transmissions. The CSI spatial domain resolution type, which can indicate type I or type II, can be determined by the UE (for example, using algorithms that determine whether a lower or higher resolution is required based on characteristics of the reference signal), and transmitted to the network node as CSI feedback.

Still referring to FIG. 2, after computing the CSI feedback, the user equipment 102 can then transmit the CSI feedback, including the format indicator FI, to the network node 104 via a feedback channel. The network node can process the CSI feedback to determine transmission scheduling parameters (e.g., downlink (DL) transmission scheduling parameters), which comprise a modulation and coding parameter applicable to modulation and coding of signals by the network node device particular to the user equipment 102.

This processing, as shown in block 204, can comprise decoding the CSI feedback. The UE can decode the FI first (which contains the RI and CSI spatial domain resolution type) and then use the information (for example, the obtained size of the CSI) to decode the remainder of the CSI (e.g., the indicator of channel quality, the indicator of channel state information, etc.).

After using the decoded CSI to determine the transmission scheduling parameters, which can comprise modulation and coding schemes (MCS) applicable to modulation and coding of the different transmissions between the network node and the user equipment, power, physical resource blocks (PRBs), etc., the network node 104 can transmit the scheduling parameters to the user equipment 102 via a downlink control channel. Thereafter and/or simultaneously, traffic data (e.g., non-control data such as texts, emails, pictures, movies, etc.) can be transferred, via a data traffic channel, from the network device 104 to the user equipment 102.

In accordance with example embodiments, a network node and user equipment can be operable to perform example methods, as illustrated in flow diagrams as described in FIG. 3 and FIG. 4 below.

Figure 3:
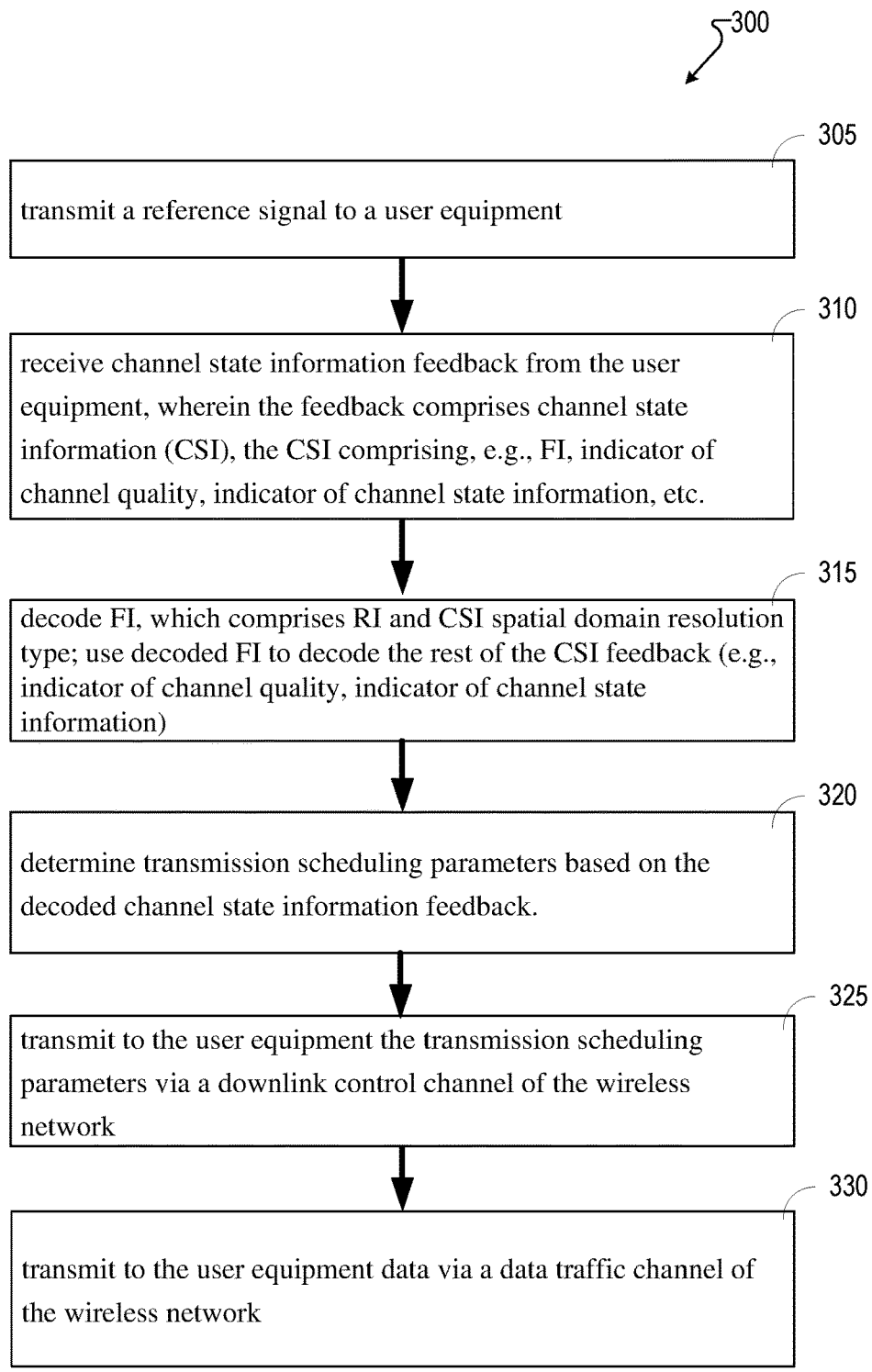
FIG. 3 illustrates an example method that can be performed by a network node employing the use of a format indicator in accordance with various aspects and embodiments of the subject disclosure.

FIG. 3 is a flow diagram 300 illustrating an example method for receiving and processing channel state information, including a format indicator FI having rank indicator RI and CSI spatial domain resolution type in accordance with example embodiments. The method, which can be performed by a network node (e.g., network node 104), can begin at step 305, wherein a reference signal can be transmitted to a user equipment (e.g., UE 102). After the UE has evaluated the reference signal, determined channel state information (which can comprise the format indicator FI, indicator of channel state information, indicator of channel quality, etc.), and transmitted the channel state information feedback via, for example, a feedback channel, the method can proceed to block 310, where channel state information feedback can be received by the network node from user equipment. At step 315, the format indicator (FI) of the channel state information can be decoded (e.g., by the network node), wherein the information decoded from the FI can be used to decode the remainder of the channel state information (e.g., indicator of channel state information, indicator of channel quality, etc.). At step 320, transmission scheduling parameters can be determined (e.g., by the network node) based on the decoded CSI feedback transmitted from the user equipment.

At step 325, the transmission scheduling parameters can be transmitted (e.g., transmitted by network node) to the user equipment via a downlink control channel. Consequently, after transmitting the downlink transmission scheduling parameter, the method can comprise transmitting data (e.g., by the network node) via a data traffic channel to the user equipment.

Figure 4:
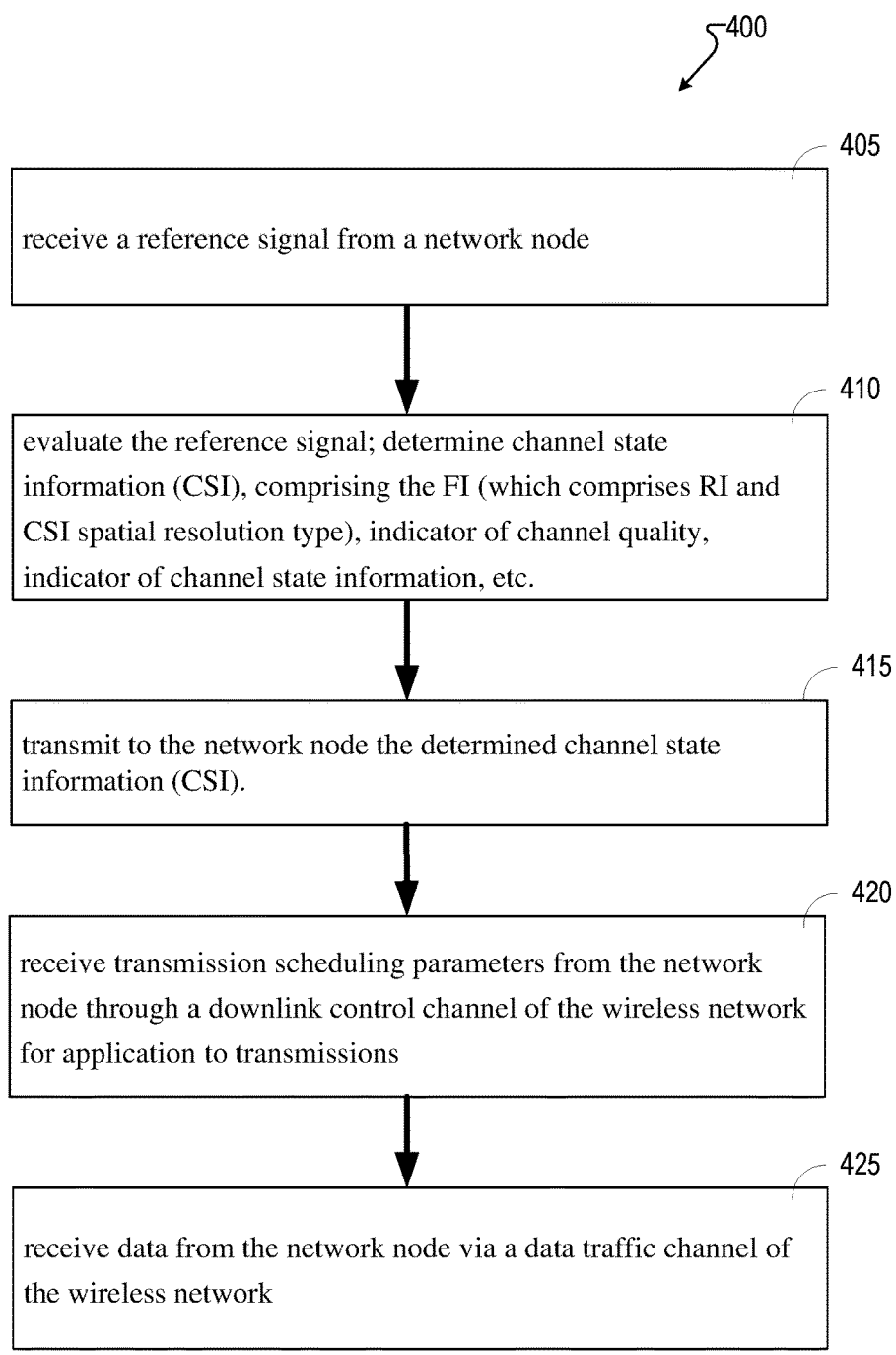
FIG. 4 illustrates an example method that can be performed by a user equipment (UE) employing the use of a format indicator in accordance with various aspects and embodiments of the subject disclosure.

FIG. 4 illustrates a flow diagram 400 of an example method for determining and transmitting channel state information, including a format indicator FI having rank indicator and CSI spatial domain resolution type, in accordance with example embodiments. The method can be performed, for example, by a user equipment (e.g., UE 102) communicating with a network node (e.g., network node 104).

The method can begin at step 405, wherein a reference signal (RS) can be received (e.g., by the UE) from a network node. At step 410, after the reference signal is received by the user device, the reference signal can be evaluated to determine the channel state information (CSI). The user equipment can determine, for example channel state information such as the indicator of channel quality, indicator of channel state information, etc. The user equipment can also determine the CSI spatial domain resolution and rank indication (e.g., a rank indicator).

At step 415, the channel state information, including format indicator, which comprises a rank indicator and CSI spatial domain resolution type (e.g., type I or type II) can be transmitted (e.g., transmitted by the UE) to the network node via a feedback channel. After being received by the network node, the network node will process the channel state information feedback to determine transmission scheduling parameters to be sent to the UE.

At step 420, the transmission scheduling parameters can be received by (e.g., by the UE) after the network node transmitted the transmission scheduling parameters via a control channel.

At step 425, data transmitted from the network node to the UE can be received (e.g., by the UE) via a data traffic channel, in accordance with the transmission scheduling parameters.

Figure 5:
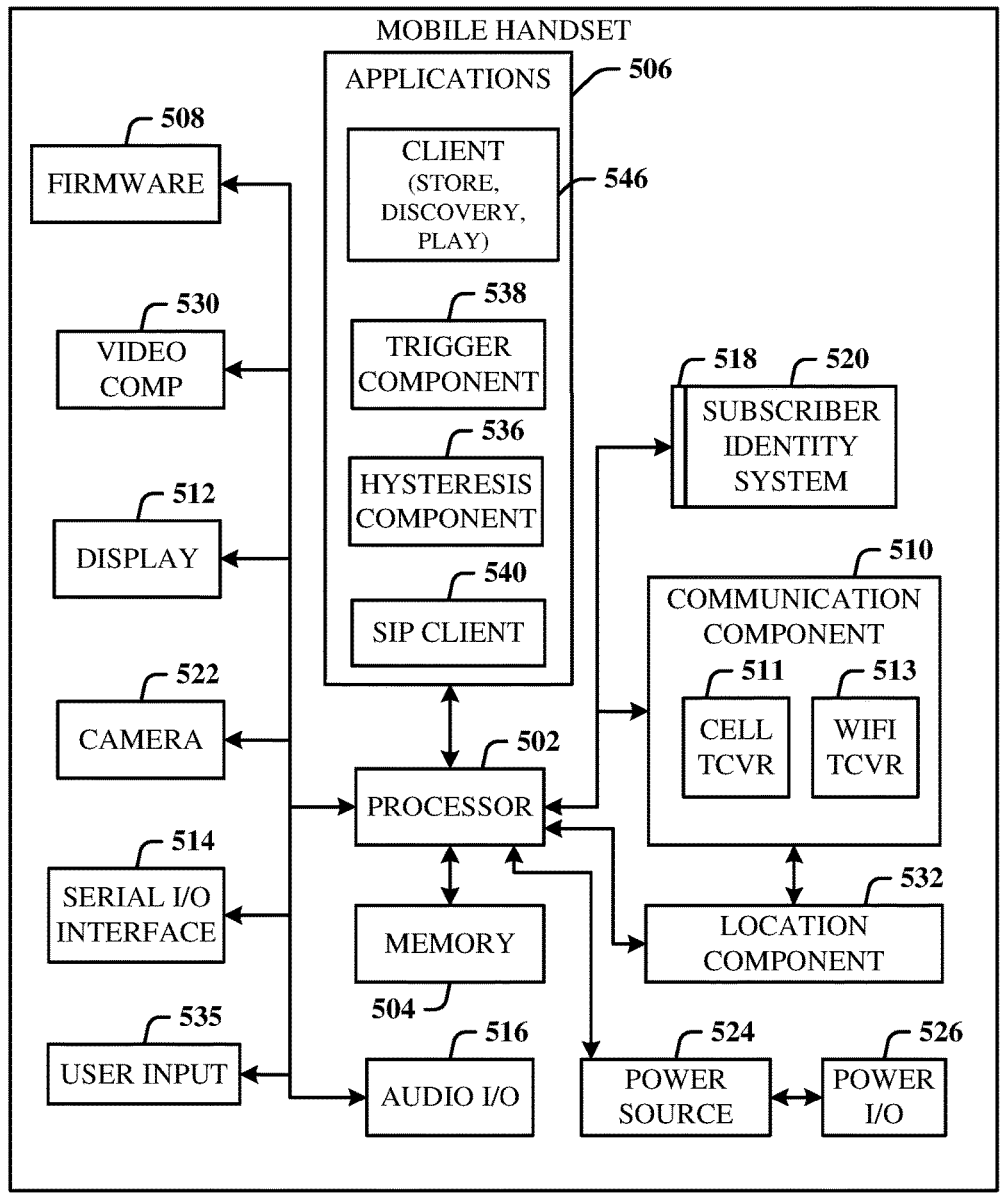
FIG. 5 illustrates an example block diagram of an example user equipment that can be a mobile handset operable to provide a format indicator in accordance with various aspects and embodiments of the subject disclosure.

Referring now to FIG. 5, illustrated is a schematic block diagram of an example end-user device such as a user equipment (e.g., user equipment 102) that can be a mobile device 500 capable of connecting to a network in accordance with some embodiments described herein. Although a mobile handset 500 is illustrated herein, it will be understood that other devices can be a mobile device, and that the mobile handset 500 is merely illustrated to provide context for the embodiments of the various embodiments described herein. The following discussion is intended to provide a brief, general description of an example of a suitable environment 500 in which the various embodiments can be implemented. While the description includes a general context of computer-executable instructions embodied on a machine-readable storage medium, those skilled in the art will recognize that the innovation also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of machine-readable media. Machine-readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules or other data. Computer storage media can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The handset 500 includes a processor 502 for controlling and processing all onboard operations and functions. A memory 504 interfaces to the processor 502 for storage of data and one or more applications 506 (e.g., a video player software, user feedback component software, etc.). Other applications can include voice recognition of predetermined voice commands that facilitate initiation of the user feedback signals. The applications 506 can be stored in the memory 504 and/or in a firmware 508, and executed by the processor 502 from either or both the memory 504 or/and the firmware 508. The firmware 508 can also store startup code for execution in initializing the handset 500. A communications component 510 interfaces to the processor 502 to facilitate wired/wireless communication with external systems, e.g., cellular networks, VoIP networks, and so on. Here, the communications component 510 can also include a suitable cellular transceiver 511 (e.g., a GSM transceiver) and/or an unlicensed transceiver 513 (e.g., Wi-Fi, WiMax) for corresponding signal communications. The handset 500 can be a device such as a cellular telephone, a PDA with mobile communications capabilities, and messaging-centric devices. The communications component 510 also facilitates communications reception from terrestrial radio networks (e.g., broadcast), digital satellite radio networks, and Internet-based radio services networks.

The handset 500 includes a display 512 for displaying text, images, video, telephony functions (e.g., a Caller ID function), setup functions, and for user input. For example, the display 512 can also be referred to as a "screen" that can accommodate the presentation of multimedia content (e.g., music metadata, messages, wallpaper, graphics, etc.). The display 512 can also display videos and can facilitate the generation, editing and sharing of video quotes. A serial I/O interface 514 is provided in communication with the processor 502 to facilitate wired and/or wireless serial communications (e.g., USB, and/or IEEE 1394) through a hardwire connection, and other serial input devices (e.g., a keyboard, keypad, and mouse). This supports updating and troubleshooting the handset 500, for example. Audio capabilities are provided with an audio I/O component 516, which can include a speaker for the output of audio signals related to, for example, indication that the user pressed the proper key or key combination to initiate the user feedback signal. The audio I/O component 516 also facilitates the input of audio signals through a microphone to record data and/or telephony voice data, and for inputting voice signals for telephone conversations.

The handset 500 can include a slot interface 518 for accommodating a SIC (Subscriber Identity Component) in the form factor of a card Subscriber Identity Module (SIM) or universal SIM 520, and interfacing the SIM card 520 with the processor 502. However, it is to be appreciated that the SIM card 520 can be manufactured into the handset 500, and updated by downloading data and software.

The handset 500 can process IP data traffic through the communication component 510 to accommodate IP traffic from an IP network such as, for example, the Internet, a corporate intranet, a home network, a person area network, etc., through an ISP or broadband cable provider. Thus, VoIP traffic can be utilized by the handset 800 and IP-based multimedia content can be received in either an encoded or decoded format.

A video processing component 522 (e.g., a camera) can be provided for decoding encoded multimedia content. The video processing component 522 can aid in facilitating the generation, editing and sharing of video quotes. The handset 500 also includes a power source 524 in the form of batteries and/or an AC power subsystem, which power source 524 can interface to an external power system or charging equipment (not shown) by a power I/O component 526.

The handset 500 can also include a video component 530 for processing video content received and, for recording and transmitting video content. For example, the video component 530 can facilitate the generation, editing and sharing of video quotes. A location tracking component 532 facilitates geographically locating the handset 500. As described hereinabove, this can occur when the user initiates the feedback signal automatically or manually. A user input component 534 facilitates the user initiating the quality feedback signal. The user input component 534 can also facilitate the generation, editing and sharing of video quotes. The user input component 534 can include such conventional input device technologies such as a keypad, keyboard, mouse, stylus pen, and/or touch screen, for example.

Referring again to the applications 506, a hysteresis component 536 facilitates the analysis and processing of hysteresis data, which is utilized to determine when to associate with the access point. A software trigger component 538 can be provided that facilitates triggering of the hysteresis component 538 when the Wi-Fi transceiver 513 detects the beacon of the access point. A SIP client 540 enables the handset 500 to support SIP protocols and register the subscriber with the SIP registrar server. The applications 506 can also include a client 542 that provides at least the capability of discovery, play and store of multimedia content, for example, music.

The handset 500, as indicated above related to the communications component 810, includes an indoor network radio transceiver 513 (e.g., Wi-Fi transceiver). This function supports the indoor radio link, such as IEEE 802.11, for the dual-mode GSM handset 500. The handset 500 can accommodate at least satellite radio services through a handset that can combine wireless voice and digital radio chipsets into a single handheld device.

Figure 6:
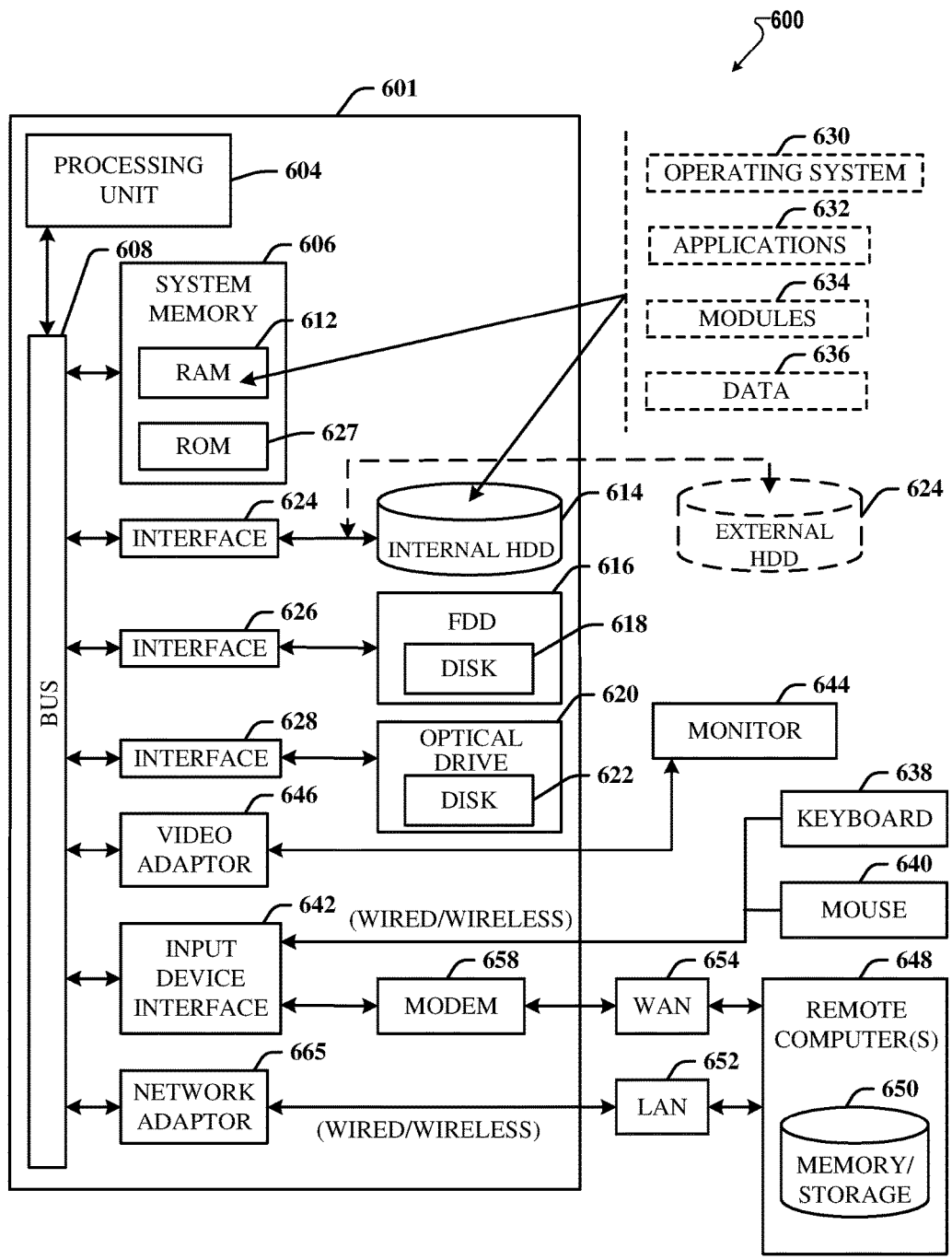
FIG. 6 illustrates an example block diagram of a computer that can be operable to execute processes and methods in accordance with various aspects and embodiments of the subject disclosure.

Referring now to FIG. 6, there is illustrated a block diagram of a computer 600 operable to execute the functions and operations performed in the described example embodiments. For example, a network node (e.g., network node 104) may contain components as described in FIG. 6. The computer 600 can provide networking and communication capabilities between a wired or wireless communication network and a server and/or communication device. In order to provide additional context for various aspects thereof, FIG. 6 and the following discussion are intended to provide a brief, general description of a suitable computing environment in which the various aspects of the innovation can be implemented to facilitate the establishment of a transaction between an entity and a third party. While the description above is in the general context of computer-executable instructions that can run on one or more computers, those skilled in the art will recognize that the innovation also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media can embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference to FIG. 6, implementing various aspects described herein with regards to the end-user device can include a computer 600, the computer 600 including a processing unit 604, a system memory 606 and a system bus 608. The system bus 608 couples system components including, but not limited to, the system memory 606 to the processing unit 604. The processing unit 604 can be any of various commercially available processors. Dual microprocessors and other multiprocessor architectures can also be employed as the processing unit 604.

The system bus 608 can be any of several types of bus structure that can further interconnect to a memory bus (with or without a memory controller), a peripheral bus, and a local bus using any of a variety of commercially available bus architectures. The system memory 606 includes read-only memory (ROM) 627 and random access memory (RAM) 612. A basic input/output system (BIOS) is stored in a non-volatile memory 627 such as ROM, EPROM, EEPROM, which BIOS contains the basic routines that help to transfer information between elements within the computer 600, such as during start-up. The RAM 612 can also include a high-speed RAM such as static RAM for caching data.

The computer 600 further includes an internal hard disk drive (HDD) 614 (e.g., EIDE, SATA), which internal hard disk drive 614 can also be configured for external use in a suitable chassis (not shown), a magnetic floppy disk drive (FDD) 616, (e.g., to read from or write to a removable diskette 618) and an optical disk drive 620, (e.g., reading a CD-ROM disk 622 or, to read from or write to other high capacity optical media such as the DVD). The hard disk drive 614, magnetic disk drive 616 and optical disk drive 620 can be connected to the system bus 608 by a hard disk drive interface 624, a magnetic disk drive interface 626 and an optical drive interface 628, respectively. The interface 624 for external drive implementations includes at least one or both of Universal Serial Bus (USB) and IEEE 1294 interface technologies. Other external drive connection technologies are within contemplation of the subject innovation.

The drives and their associated computer-readable media provide nonvolatile storage of data, data structures, computer-executable instructions, and so forth. For the computer 600 the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer 600, such as zip drives, magnetic cassettes, flash memory cards, cartridges, and the like, can also be used in the example operating environment, and further, that any such media can contain computer-executable instructions for performing the methods of the disclosed innovation.

A number of program modules can be stored in the drives and RAM 612, including an operating system 630, one or more application programs 632, other program modules 634 and program data 636. All or portions of the operating system, applications, modules, and/or data can also be cached in the RAM 612. It is to be appreciated that the innovation can be implemented with various commercially available operating systems or combinations of operating systems.

A user can enter commands and information into the computer 600 through one or more wired/wireless input devices, e.g., a keyboard 638 and a pointing device, such as a mouse 640. Other input devices (not shown) may include a microphone, an IR remote control, a joystick, a game pad, a stylus pen, touch screen, or the like. These and other input devices are often connected to the processing unit 604 through an input device interface 642 that is coupled to the system bus 608, but can be connected by other interfaces, such as a parallel port, an IEEE 2394 serial port, a game port, a USB port, an IR interface, etc.

A monitor 644 or other type of display device is also connected to the system bus 608 through an interface, such as a video adapter 646. In addition to the monitor 644, a computer 600 typically includes other peripheral output devices (not shown), such as speakers, printers, etc.

The computer 600 can operate in a networked environment using logical connections by wired and/or wireless communications to one or more remote computers, such as a remote computer(s) 648. The remote computer(s) 648 can be a workstation, a server computer, a router, a personal computer, portable computer, microprocessor-based entertainment device, a peer device or other common network node, and typically includes many or all of the elements described relative to the computer, although, for purposes of brevity, only a memory/storage device 650 is illustrated. The logical connections depicted include wired/wireless connectivity to a local area network (LAN) 652 and/or larger networks, e.g., a wide area network (WAN) 654. Such LAN and WAN networking environments are commonplace in offices and companies, and facilitate enterprise-wide computer networks, such as intranets, all of which may connect to a global communications network, e.g., the Internet.

When used in a LAN networking environment, the computer 600 is connected to the local network 652 through a wired and/or wireless communication network interface or adapter 656. The adapter 656 may facilitate wired or wireless communication to the LAN 652, which may also include a wireless access point disposed thereon for communicating with the wireless adapter 656.

When used in a WAN networking environment, the computer 600 can include a modem 658, or is connected to a communications server on the WAN 654, or has other means for establishing communications over the WAN 654, such as by way of the Internet. The modem 658, which can be internal or external and a wired or wireless device, is connected to the system bus 608 through the input device interface 642. In a networked environment, program modules depicted relative to the computer, or portions thereof, can be stored in the remote memory/storage device 650. It will be appreciated that the network connections shown are exemplary and other means of establishing a communications link between the computers can be used.

The computer is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE802.11 (a, b, g, n, etc.) to provide secure, reliable, fast wireless connectivity. A Wi-Fi network can be used to connect computers to each other, to the Internet, and to wired networks (which use IEEE802.3 or Ethernet). Wi-Fi networks operate in the unlicensed 2.4 and 5 GHz radio bands, at an 11 Mbps (802.11b) or 54 Mbps (802.11a) data rate, for example, or with products that contain both bands (dual band), so the networks can provide real-world performance similar to the basic "10BaseT" wired Ethernet networks used in many offices.

As used in this application, the terms "system," "component," "interface," and the like are generally intended to refer to a computer-related entity or an entity related to an operational machine with one or more specific functionalities. The entities disclosed herein can be either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. These components also can execute from various computer readable storage media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry that is operated by software or firmware application(s) executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. An interface can comprise input/output (I/O) components as well as associated processor, application, and/or API components.

Furthermore, the disclosed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, computer-readable carrier, or computer-readable media. For example, computer-readable media can include, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor also can be implemented as a combination of computing processing units.

In the subject specification, terms such as "store," "data store," "data storage," "database," "repository," "queue", and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory. In addition, memory components or memory elements can be removable or stationary. Moreover, memory can be internal or external to a device or component, or removable or stationary. Memory can comprise various types of media that are readable by a computer, such as hard-disc drives, zip drives, magnetic cassettes, flash memory cards or other types of memory cards, cartridges, or the like.

By way of illustration, and not limitation, nonvolatile memory can comprise read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated example aspects of the embodiments. In this regard, it will also be recognized that the embodiments comprises a system as well as a computer-readable medium having computer-executable instructions for performing the acts and/or events of the various methods.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can comprise, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communications media comprise wired media, such as a wired network or direct-wired connection, and wireless media such as acoustic, RF, infrared and other wireless media Further, terms like "user equipment," "user device," "mobile device," "mobile," station," "access terminal," "terminal," "handset," and similar terminology, generally refer to a wireless device utilized by a subscriber or user of a wireless communication network or service to receive or convey data, control, voice, video, sound, gaming, or substantially any data-stream or signaling-stream. The foregoing terms are utilized interchangeably in the subject specification and related drawings. Likewise, the terms "access point," "node B," "base station," "evolved Node B," "cell," "cell site," and the like, can be utilized interchangeably in the subject application, and refer to a wireless network component or appliance that serves and receives data, control, voice, video, sound, gaming, or substantially any data-stream or signaling-stream from a set of subscriber stations. Data and signaling streams can be packetized or frame-based flows. It is noted that in the subject specification and drawings, context or explicit distinction provides differentiation with respect to access points or base stations that serve and receive data from a mobile device in an outdoor environment, and access points or base stations that operate in a confined, primarily indoor environment overlaid in an outdoor coverage area. Data and signaling streams can be packetized or frame-based flows.

Furthermore, the terms "user," "subscriber," "customer," "consumer," and the like are employed interchangeably throughout the subject specification, unless context warrants particular distinction(s) among the terms. It should be appreciated that such terms can refer to human entities, associated devices, or automated components supported through artificial intelligence (e.g., a capacity to make inference based on complex mathematical formalisms) which can provide simulated vision, sound recognition and so forth. In addition, the terms "wireless network" and "network" are used interchangeable in the subject application, when context wherein the term is utilized warrants distinction for clarity purposes such distinction is made explicit.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

In addition, while a particular feature may have been disclosed with respect to only one of several implementations, such feature may be combined with one or more other features of the other implementations as may be desired and advantageous for any given or particular application. Furthermore, to the extent that the terms "includes" and "including" and variants thereof are used in either the detailed description or the claims, these terms are intended to be inclusive in a manner similar to the term "comprising."

The above descriptions of various embodiments of the subject disclosure and corresponding figures and what is described in the Abstract, are described herein for illustrative purposes, and are not intended to be exhaustive or to limit the disclosed embodiments to the precise forms disclosed. It is to be understood that one of ordinary skill in the art may recognize that other embodiments having modifications, permutations, combinations, and additions can be implemented for performing the same, similar, alternative, or substitute functions of the disclosed subject matter, and are therefore considered within the scope of this disclosure. Therefore, the disclosed subject matter should not be limited to any single embodiment described herein, but rather should be construed in breadth and scope in accordance with the claims below.

What is claimed is:

1. A network node device, comprising:
a processor; and
a memory that stores executable instructions that, when executed by the processor, facilitate performance of operations, comprising:
transmitting a reference signal to a user equipment using an antenna, wherein the antenna is coupled to a radio frequency transmitter and a radio frequency receiver that respectively transmit and receive via a channel that operates according to a multiple input multiple output protocol;
in response to the transmitting the reference signal, receiving channel state information feedback from the user equipment, wherein the channel state information feedback comprises:
a first portion comprising a format indicator, the format indicator comprising a first data element comprising a channel state information spatial domain resolution type representative of a spatial domain resolution type of channel state information and a second data element comprising a rank indicator representative of a number of different data streams transmitted between the network node device and the user equipment, and
a second portion comprising:
a third data element comprising a first indicator of the channel state information used for selection of transmission parameters for the different data streams transmitted between the network node device and the user equipment, and
a fourth data element comprising a second indicator of channel quality applicable to a quality of the channel between the network node device and the user equipment; and
decoding the channel state information feedback, resulting in decoded channel state information feedback, the decoding comprising:
decoding the first portion, resulting in a decoded format indicator, and
based on the decoded format indicator, decoding the second portion.

2. The network node device of claim 1, wherein the operations further comprise determining a transmission scheduling parameter of the transmission parameters based on the decoded channel state information feedback.

3. The network node device of claim 2, wherein the transmission scheduling parameter comprise a modulation and coding parameter applicable to modulation and coding of the different data streams.

4. The network node device of claim 2, wherein the operations further comprise transmitting, to the user equipment, the transmission scheduling parameter.

5. The network node device of claim 1, wherein the operations further comprise transmitting traffic data to the user equipment.

6. The network node device of claim 1, wherein the user equipment comprises an internet of things device.

7. The network node device of claim 1, wherein the reference signal comprises a beam-formed signal.

8. The network node device of claim 1, wherein the reference signal comprises a non beam-formed signal.

9. The network node device of claim 1, wherein the spatial domain resolution type indicates a first spatial resolution as a default spatial domain resolution type applicable by default to the different data streams.

10. The network node device of claim 1, wherein a first spatial resolution is a default spatial domain resolution type, and wherein the spatial domain resolution type indicates a second spatial resolution higher than the first spatial resolution.

11. A user equipment, comprising:
a processor; and
a memory that stores executable instructions that, when executed by the processor, facilitate performance of operations, comprising:
receiving a reference signal from a network device via an antenna coupled to a radio frequency transmitter and radio frequency receiver;
determining channel state information from the reference signal, the channel state information comprising:
a format indicator, the format indicator comprising a first data element comprising a channel state information spatial domain resolution type representative of a spatial domain resolution of the channel state information and a second data element comprising a rank indicator representative of a number of different transmissions between the network device and the user equipment,
a third data element comprising a first indicator of channel state information used to select transmission parameters for the different transmissions between the network device and the user equipment, and
a fourth data element comprising a second indicator of channel quality applicable to a quality of the channel between the network device and the user equipment; and
transmitting, to the network device, channel state information feedback comprising a first portion comprising the format indicator and a second portion comprising the third data element and the fourth data element, wherein the transmitting the channel state information feedback to the network device enables the network device to decode the first portion, resulting in a decoded first portion that is usable to decode the second portion.

12. The user equipment of claim 11, wherein the operations further comprise receiving transmission scheduling parameters from the network device, and wherein the transmission scheduling parameters were determined based on the channel state information feedback.

13. The user equipment of claim 12, wherein the transmission scheduling parameters comprise a modulation and coding scheme applicable to modulation and coding of the different transmissions between the network device and the user equipment.

14. The user equipment of claim 11, wherein the performance of operations further comprises receiving traffic data from the network device.

15. The user equipment of claim 11, wherein the user equipment comprises an internet of things device.

16. The user equipment of claim 11, wherein the reference signal comprises a beam-formed signal.

17. The user equipment of claim 11, wherein the reference signal comprises a non beam-formed signal.

18. The user equipment of claim 11, wherein the channel state information spatial domain resolution type indicates a first spatial resolution that is higher than a second spatial resolution that is used as a default spatial resolution.

19. A method, comprising:
transmitting, by a network device comprising a processor, a reference signal to a user equipment using a multiple input multiple output protocol;
receiving, by the network device, information from the user equipment, wherein the information comprises channel state information feedback, the channel state information feedback comprising:
a first portion of the channel state information feedback comprising a format indicator, the format indicator comprising:
a first data element comprising a spatial domain resolution type representative of a spatial domain resolution of the channel state information, and
a second data element comprising a rank indicator representative of a number of signals transmitted between the network device and the user equipment, and
a second portion of the channel state information feedback comprising
a third data element comprising a channel state information indicator used to select transmission parameters applicable to the signals transmitted between the network device and the user equipment, and
a fourth data element comprising an indication of channel quality applicable to a quality of the channel used to transmit the signals between the network device and the user equipment;
decoding, by the network device, the channel state information feedback resulting in decoded feedback, comprising:
decoding the first portion resulting in a decoded format indicator; and
based on the decoded format indicator, decoding the second portion;
based on the decoded feedback, determining, by the network device, a transmission scheduling parameter, wherein the transmission scheduling parameter comprises a modulation and coding parameter applicable to modulation and coding of the signals by the network device;
transmitting, by the network device to the user equipment, the transmission scheduling parameter to configure the user equipment according to the transmission scheduling parameter; and
transmitting, by the network device to the user equipment, traffic data.

20. The method of claim 19, wherein the reference signal comprises a beam-formed signal.

* * * * *